United States Patent [19]

Chen

[11] Patent Number: 4,968,197
[45] Date of Patent: Nov. 6, 1990

[54] BLANK DUCT PLUG
[75] Inventor: Marshall Chen, Mission Viejo, Calif.
[73] Assignee: Jack Moon Co., Ltd., Taipei, Taiwan
[21] Appl. No.: 409,358
[22] Filed: Sep. 19, 1989
[51] Int. Cl.⁵ .................... F16B 13/04; F16L 55/10
[52] U.S. Cl. ................................. 411/34; 411/55; 138/90
[58] Field of Search ................... 411/34–38, 411/55, 907; 138/89, 90

[56] References Cited

U.S. PATENT DOCUMENTS

| | | | |
|---|---|---|---|
| 987,145 | 3/1911 | Leisinger | 138/89 |
| 2,542,967 | 2/1951 | Waechter | 411/34 |
| 3,457,959 | 7/1969 | Cooper | 138/90 |
| 3,704,729 | 12/1972 | Tomlinson | 138/90 |
| 4,762,151 | 8/1988 | Kinnan | 138/89 |

Primary Examiner—Neill R. Wilson
Attorney, Agent, or Firm—Lowe, Price, LeBlanc, Becker and Shur

[57] ABSTRACT

A pipe plug is disclosed which includes a disc-like screw plate, an elastic sealing ring, a horn-like pressure block, and a lifting eye. The screw plate receives the bottom edge of the sealing ring and the horn-like pressure block is mounted on the upper edge. The screw plate has a central rod that extends upwardly through a hole in the pressure block. The lifting eye is then threadedly received on the end of the rod and as the lifting eye is turned, the block and plate will be urged together causing the sealing ring to expand against the internal wall of a pipe.

1 Claim, 4 Drawing Sheets

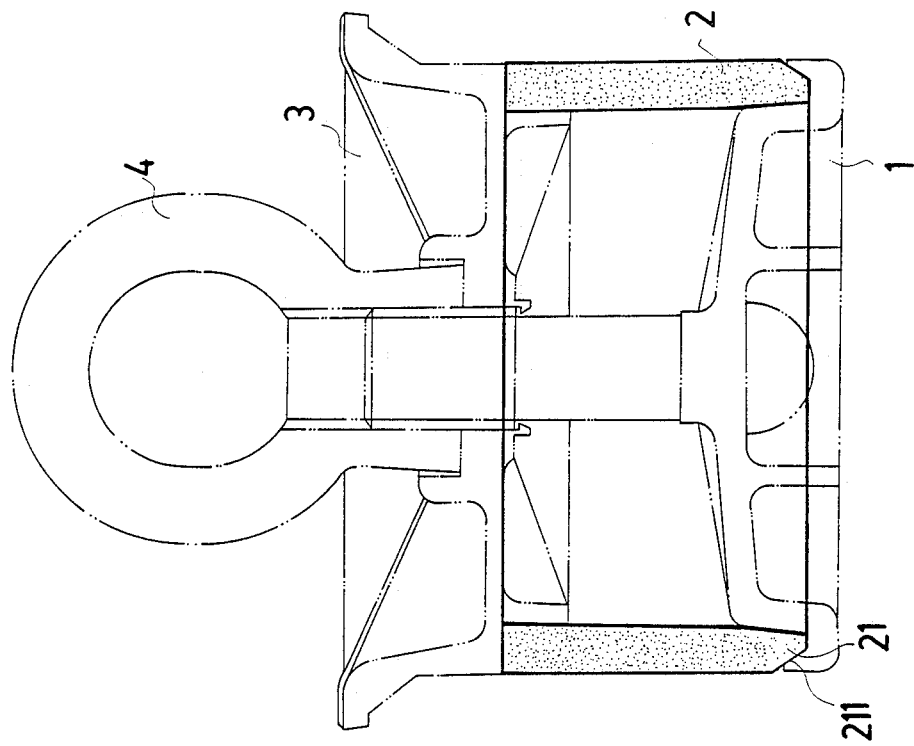
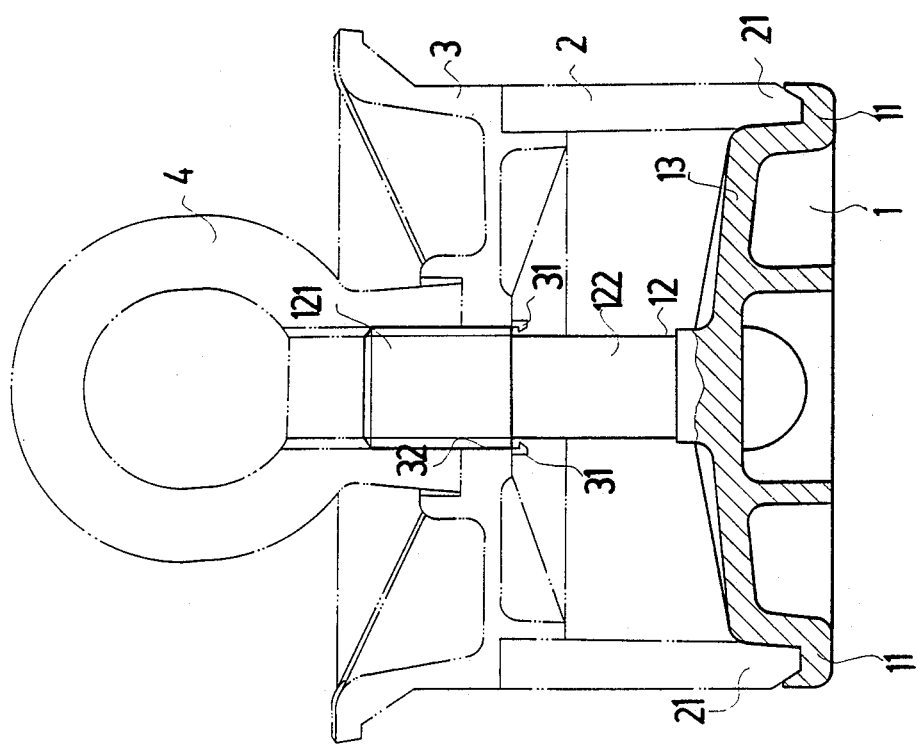

BLANK DUCT PLUG

BACKGROUND OF THE INVENTION

The present invention is related to a pipe plug and more particuarly to the one which includes an elastic sealing ring to tightly block up the boring bore of a pipe when it is squeezed, so to prevent from entering of sludge, waste water or gas into the pipe, and which can be conveniently removed from the pipe for repeated use.

The pipe plug of the present invention is flexibly for use to seal regular 4" pipe with caliber tolerance within +/−8m/m (for example, regular electric pipe, telecommunication pipe, thin pipe, thick pipe, or drain etc.). The elastic sealing ring of the pipe plug of the present invention can be squeezed to uniformly expand outward so as to tightly stop against the inner wall of the tube or pipe to let the tube or pipe be tightly blocked up to prevent from entering of outside sludge, waste water or gas into the tube or pipe. The pipe plug of the present invention is generally comprised of four component parts tightly connected together, which component parts do not break away from each other when the pipe plug is conventiently mounted on or removed from a tube or pipe.

SUMMARY OF THE INVENTION

It is therefore, the main object of the present invention to provide such a pipe plug which is convention to mount on or remove from a tube or pipe.

Another object of the present invention is to provide such a pipe plug which is easy to assemble and the component parts of which do not break away from each other when they are connected together for service, and will not drop into a tube or pipe when the pipe plug is used to seal tube or pipe.

A yet further object of the present invention is to provide such a pipe plug which can be flexibly expand, according to the caliber of tube or pipe, to tightly seal the mouth of a tube or pipe so as to prevent from entering of outside matters or gas into the tube or pipe.

Acording to the present invention, a pipe plug is generally comprised of a disc-like screw means, an elastic sealing ring mounted on the disc-like screw means, a horn-like pressure block mounted on the elastic sealing ring, and a lifting eye mounted on the born-like pressure block to screw up with the outer thread of the round rod of the disc-like screw means. The elastic sealing ring will be squeezed to uniformly expand outward to tightly block up the boring bore of a tube or pipe when the liftiing eye is turned clockwise to screw inward with the round rod of the disc-like screw means, or the pipe plug may be removed from a tube or pipe when the lifting eye is turned counter-clockwise to let the elastic sealing ring be released from squeezing.

The above and other objects, features and advantages of the present invention will be fully understood from the following detailed description of the preferred embodiments considered in connection with the annexed drawings in which:

BRIEF DESCRIPTION OF THE DRAWINGS

FIG. 2 illustrates the structure of the disc-shaped screw means of the present invention;

FIG. 3 illustrates the structure of the elastic sealing ring of the present invention;

Figure 6:
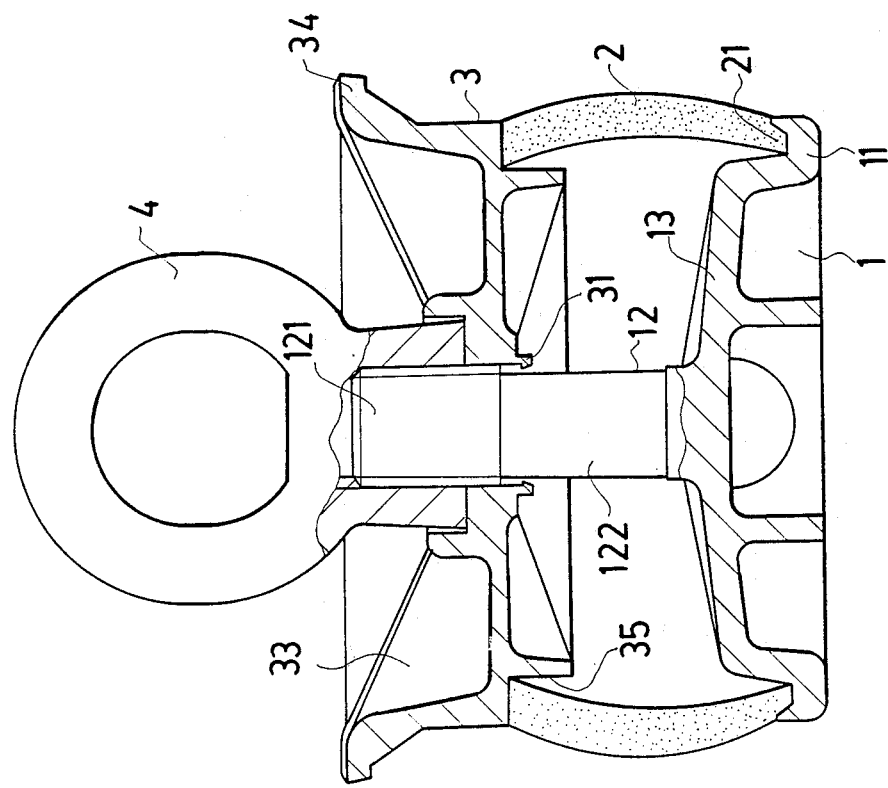

5 illustrates the structure of the life eye of the present invention;

FIG. 6 is a perspective assembly view of the present invention; and

Figure 7:
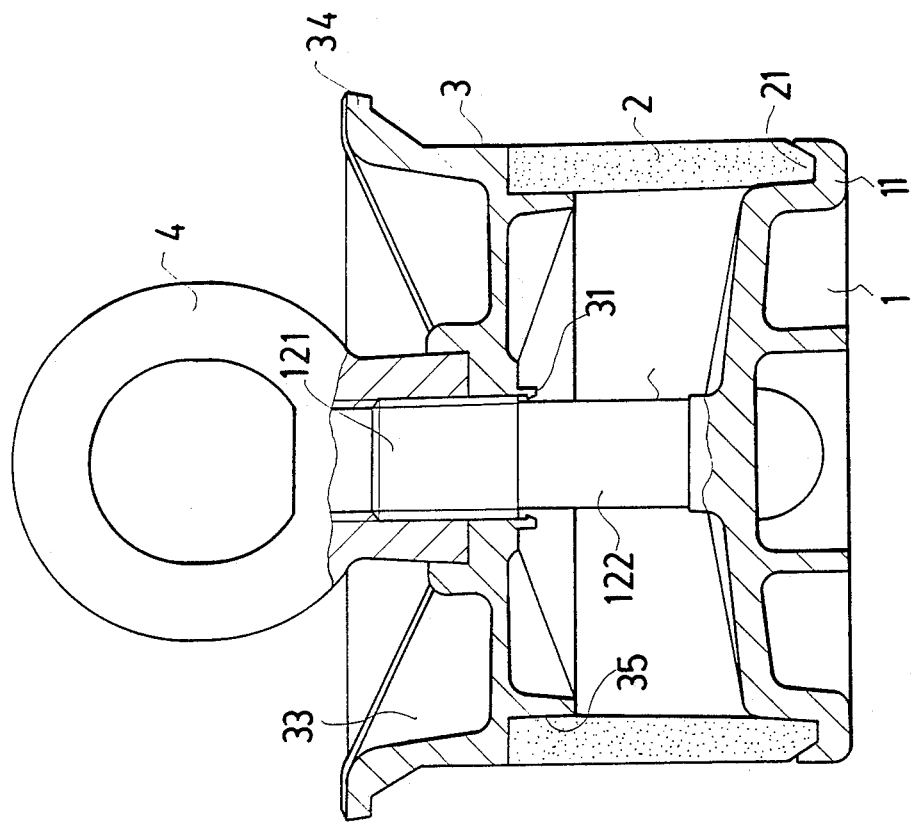

FIG. 7 is a schematic drawing illustrating the operation of the present invention.

(1) Disc-like screw means
(12) Round rod
(122) Smooth rod portion
(2) Elastic sealing ring
(211) Bevel ring portion
(31) Pintle hook
(33) Reinforced rib
(35) Ring shaped bottom end
(41) Bottom rod Portion
(11) Circular groove
(121) Outer thread
(13) Bottom pan
(21) Outer bottom
(3) Pressure block
(32) Center hole
(34) Disc portion
(4) Lifting eye
(42) Inner thread

DETAILED DESCRIPTION OF THE PREFERRED EMBODIMENT

Turning now to the attached drawings in detail, therein illustrated is a pipe plug embodying the present invention and generally comprised of a disc-like screw means (1), an elastic sealing ring (2), a horn-like pressure block (3), and a lifting eye or lock nut (4).

Figure 1:
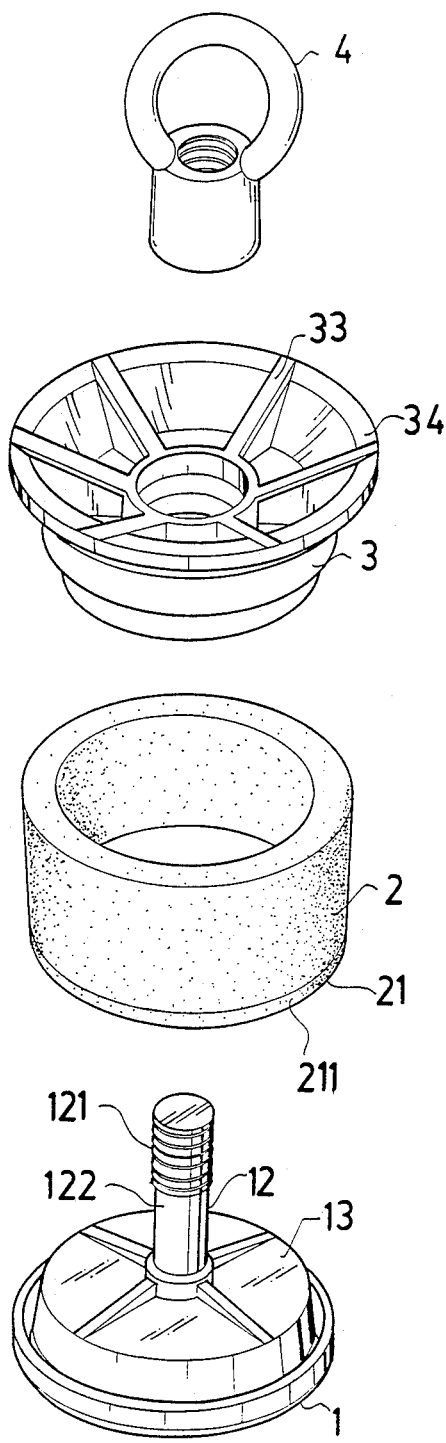
FIG. 1 is a perspective fragmentary view of a pipe plug embodying the present invention.

Referring to FIGS. 1 and 2, the disc-like screw means (1) is rigid plastics, comprising a circular convex bottom pan (13) having a round rod (12) integrally vertically raised therefrom in the center, and a circular groove (11), around its peripheral, wherein the round rod (12) is reducing doenward in diameter, comprising an outer thread (121) made on the top half portion and set to penetrate through the elastic sealing ring (2) and the horn-like pressure block (3) to screw up with the lifting eye or look nut (4), such that the elastic sealing ring (2) will be squeezed to expand so as to seal the boring bore of a tube when the present pipe plug is set in a pipe and the lifting eye (or lock nut) (4) is screwed clockwise with the other thread (121) of the disc-like screw means (1); or the elastic sealing ring (2) will be released to remove from a pipe when the lifting eye or lock nut (4) is turned counter-clockwise to lose the engagement with the round rod (12) of the disc-like screw means (1). According to the present invention, the lower half portion of the round rod (12) of the disc-like screw means (1) is a smooth rod portion (122) in reduced diameter. When the round rod (12) of the disc-like screw means (1) is inserted through the elastic sealing ring (2) and the horn-like pressure block (3) to screw up with the lifting eye or lock nut (4), the pintle hooks (31) inside the center hole (32) of the horn-like pressure block (3) will be engaged with the smooth rod portion (122) of the round rod (12) (as shown in FIG. 1–4) to protect the pressure block (3), the elastic sealing ring (2) and the disc-like screw means (1) from breaking away. The disc-like screw means (1) has a stepped circular bottom served to firmly hold the outer bottom (21) of the elastic sealing ring (2) so as to prevent the outer bottom (21) of the elastic sealing ring (2) from been squeezed inward. A circular groove (11) is made around the periphery to define therein a raised bottom pan (13). When in operation, the thinner circular outer bottom (21) of the elastic sealing ring (2) is set in the circular groove (11) of the disc-like screw means (1). Therefore, when the disc-like screw means (1) is screwing up the lifting eye (4) to squeeze the elastic sealing ring (2), the circular outer bottom (21) of the elastic sealing ring (2) is firmly retained in the circular groove (11) against turning up and therefore, the squeezing force is uniformly applied onto the elastic sealing ring (2) to force it expand outward uniformly.

Referring to FIGS. 1 and 3, the elastic sealiing ring (2) is preferably made of elastic material like rubber or resilient plastics, comprising a circular sleeve body having a bevel ring portion (inner bottom) (211) made at ⅛ from the bottom. When the elastic sealing ring (2) is set between the disc-like screw means (1) and the pressure block (3), the bevel ring portion (211) is inserted in the circular groove (11) of the disc-like screw means (1) to let the outer bottom (21) be firmly supported by the circular bottom pan (13) of the disc-like screw means (1) such that the pressing force from the disc-like screw means (1) and the pressure block (3) is uniformly applied on the elastic sealing ring (2) to efficiently force it expand outward.

Figure 4:
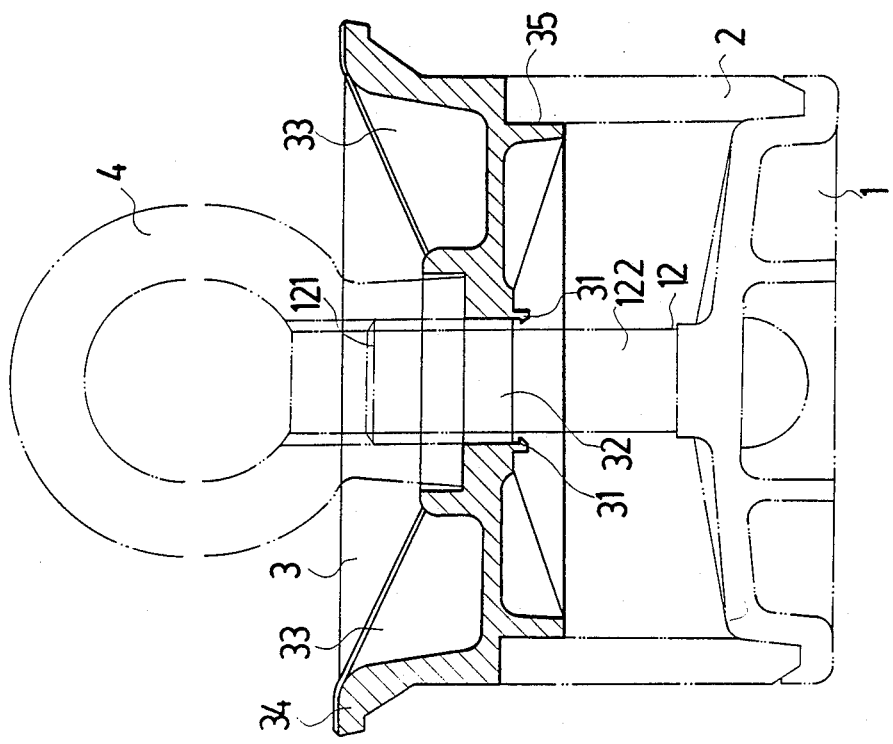
FIG. 4 illustrates the structure of the pressure block of the present invention.

Referring to FIGS. 1 and 4, the horn-like pressure block (3) is preferably made of rigid materials such as iron, non-ferrous metal or rigid plastics, comprising a horn-like disc portion (34), which is to be mounted on the elastic sealing ring (2) at the top, having a ring-shaped bottom end (35) in reduced diameter, which will be inserted inside the elastic sealing ring (2) to support the elastic sealing ring (2) against inward squeezing when the pressure block (3) is mounted thereon, a center hole (32) in the center through which the round rod (12) of the disc-like screw means (1) is inserted, 6 pieces of reinforced ribs (33) equiangularly made thereon from the center hole (32) to the periphery of the horn-like disc portion (34) to reinforce the structure against squeezing, and two pintle hooks (31) set in the center hole (32), which two pintle hooks (31) will be pushed open by the outer thread (121) of the round rod (12) of the disc-like screw means (1), when the pressure block (3) is mounted on the elastic sealing ring (2), to drop to the smooth rod portion (122) and to become firmly engaged therewith so as to let the pressure block (3), the sealing ring (2) and the screw means (1) be firmly retained against breaking away from each other.

Figure 5:
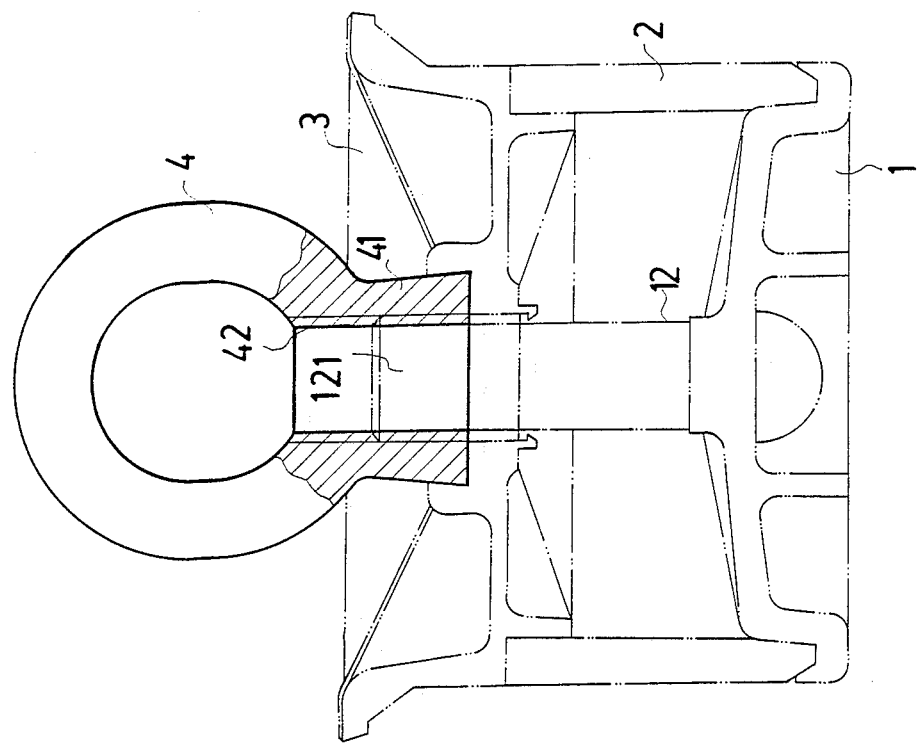

Referring to FIGS. 1 and 5, the lifting eye (4) of the present invention is preferably made of rigid material such as iron, non-ferrous metal or rigid plastics comprised of a top ring portion, and a bottom rod portion (41) having made therein an inner thread (42), wherein the bottom rod portion (41) is to have its inner thread (42) be screwed up with the outer thread (121) of the round rod (12) of the screw means (1), such that the elastic sealing ring (2) will be squeezed to expand and to tightly seal the mouth of a pipe when the lifting eye (4) is turned clockwise to screw tight with the screw means (1) or the elastic sealing ring (2) will be released to remove from the pipe when the lifting eye (4) is turned counter-clockwise to disengage with the screw means (1). As an alternate from the lifting eye (4) may be replaced by a conventional hexagonal or square lock nut to provide same effect.

When in assembly, the disc-like screw means (1) is placed at the bottom. When the elastic sealing ring (2) is mounted on the screw means (1), the horn-like pressure block (3) is placed on the top of the sealing ring (2) and firmly pressed downward to let the outer thread (121) of the round rod (12) penetrate through the hole (32) of the pressure block (3) for connected with the lifting eye (4) by means of screw joint.

When in use, the present pipe plug is placed in the mouth of a tube having the elastic sealing ring (2) smoothly set inside the mouth of the tube and having the pressure block (3) stopped at the outer side. When the lifting eye (4) is turned clockwise, the elastic sealing ring (2) will be squeezed to expand and to tightly block up the mouth of the pipe so as to prevent from entering of sludge or waste water into the pipe. When the lifting eye (4) is turned counter-clockwise, the pressing force is immediately released from the sealing ring (2) to allow the present pipe plug to be removed from the pipe (in case a lock nut is used to replace the lifting eye, a wrench or hand tool may be used).

What is claimed is:
1. A pipe plug comprising:
a disc-like bottom block having a rod coaxially extending from an upper surface thereof and having a circular groove extending around the periphery of said block along the upper surface, said rod having a threaded upper portion;
an elastic sealing ring having a lower beveled edge received in the circular groove of said block;
a horn-like pressure block having an upper plate-like surface and a lower surface of lesser diameter forming an L-shaped groove around the periphery of said lower surface, the upper surface of said sealing ring being received in said groove in said horn-like pressure block, said block also having an axial hole therethrough receiving the upper portion of said rod, said pressure block further forming reinforcing ribs on the lower surface thereof integrally with said block and extending radially from the center hole to the periphery of said block and two pintle hooks set in the lower surface at the center hole, said hooks being dimensioned to be pushed open by the threaded portion of said rod as it is pushed through the center hole and to engage the smooth lower portion of said rod;
a lifting eye having an internal threaded portion dimensioned to receive the threaded end of said rod so that as the eye is screwed downwardly onto the rod, the horn-like pressure block and the disc-like bottom block will be drawn together causing the elastic ring to expand.

* * * * *